United States Patent
Bejtlich, III et al.

(10) Patent No.: US 7,763,157 B2
(45) Date of Patent: Jul. 27, 2010

(54) ELECTRODEIONIZATION DEVICE

(75) Inventors: Chester L. Bejtlich, III, Reading, MA (US); Turgut Sarioglu, Waltham, MA (US); Gastón de los Reyes, Boston, MA (US); Wisam Yacteen, Waltham, MA (US)

(73) Assignee: Millipore Corporation, Billerica, MA (US)

( * ) Notice: Subject to any disclaimer, the term of this patent is extended or adjusted under 35 U.S.C. 154(b) by 283 days.

(21) Appl. No.: 10/816,754

(22) Filed: Apr. 2, 2004

(65) Prior Publication Data

US 2004/0206627 A1    Oct. 21, 2004

Related U.S. Application Data

(60) Provisional application No. 60/462,346, filed on Apr. 11, 2003.

(51) Int. Cl.
*B01D 61/48* (2006.01)
*B01D 61/44* (2006.01)

(52) U.S. Cl. .................... 204/632; 204/630

(58) Field of Classification Search .............. 204/632, 204/630
See application file for complete search history.

(56) References Cited

U.S. PATENT DOCUMENTS

| | | | |
|---|---|---|---|
| 3,124,522 A | 3/1964 | Arden et al. | |
| 4,632,745 A | 12/1986 | Giuffrida et al. | 204/301 |
| 4,747,929 A | 5/1988 | Siu et al. | 204/301 |
| 4,925,541 A | 5/1990 | Giuffrida et al. | |
| 4,931,160 A | 6/1990 | Giuffrida | 204/301 |
| 5,026,465 A | 6/1991 | Katz et al. | 204/182.4 |
| 5,558,753 A | 9/1996 | Gallagher et al. | 204/632 |
| 5,593,563 A | 1/1997 | Denoncourt et al. | 204/524 |
| 6,056,878 A | 5/2000 | Tessier et al. | 210/639 |
| 6,123,823 A | 9/2000 | Mani | 204/632 |
| 6,156,180 A | 12/2000 | Tessier et al. | 204/524 |
| 6,284,124 B1 * | 9/2001 | DiMascio et al. | 205/753 |
| 6,296,751 B1 | 10/2001 | Mir | 204/524 |
| 6,312,577 B1 | 11/2001 | Ganzi et al. | 204/524 |
| 6,365,023 B1 | 4/2002 | De Los Reyes et al. | |
| 6,379,518 B1 | 4/2002 | Osawa et al. | 204/524 |
| 6,391,178 B1 | 5/2002 | Garcia et al. | 204/628 |
| 6,402,920 B1 | 6/2002 | Sato et al. | 204/636 |
| 6,482,304 B1 * | 11/2002 | Emery et al. | 204/524 |
| 6,495,014 B1 | 12/2002 | Datta et al. | 204/533 |
| 2002/0144954 A1 * | 10/2002 | Arba et al. | 210/742 |

FOREIGN PATENT DOCUMENTS

| | | |
|---|---|---|
| EP | 0346502 | 12/1989 |
| EP | 0379116 | 7/1990 |
| EP | 0856351 | 8/1998 |
| EP | 1068901 | 7/2001 |
| EP | 1233004 | 8/2002 |

* cited by examiner

*Primary Examiner*—Arun S Phasge (57) ABSTRACT

An electrodeionization device for large-volume ultra-pure deionization of water is disclosed. The device comprises a plurality of alternating ion depletion and concentration compartments, interposed between an anode assembly and a cathode assembly, through which flows either a product stream or a waste stream. Each compartment contains several fluid-accessible channels packed with an appropriate ion-exchange medium. The flow of the waste and product streams among the compartments is "parallel" (i.e., contemporaneous). The flow of a stream through the compartments—i.e., through the channels therein—is "serial" (i.e., sequential). In an embodiment, electrical current is generated through the compartments using segmented electrodes—either in the anode and/or the cathode assembly—that are connected to a single multiple-outlet power source. The device is fast, efficient, robust, and its configuration is comparatively easy to scale upwards to accommodate larger water processing volumes.

20 Claims, 8 Drawing Sheets

ELECTRODEIONIZATION DEVICE

REFERENCE TO RELATED APPLICATION

The present application claims the benefit of U.S. Provisional Application Ser. No. 60/462,346, filed Apr. 11, 2003.

FIELD

In general, the present invention is directed to an electrodeionization device, and more particularly, to a scalable, robust electrodeionization device suited for "ultra-pure" deionization.

BACKGROUND

Water purification is of considerable interest in many industries. For example, in the pharmaceutical industry, so-called "ultra-pure" water (i.e., water having a resistivity of 18.2 megaohms/cm) is used in many of the reactions either under study for researching new drugs or involved in drug manufacture. An inordinately high concentration of ions and other impurities in such water can affect negatively such reactions, introducing sources of error that can result in misdiagnosis or otherwise flawed data.

Electrodeionization is a process for removing ions from liquids by sorption of these ions into a solid material capable of exchanging these ions either for hydrogen ions (for cations) or hydroxide ions (for anions) and simultaneous or later removal of the sorbed ions by the application of an electric field.

The electrodeionization process is often conducted in an apparatus consisting of alternating diluting compartments and concentrating compartments separated by anion and cation permeable membranes. The diluting compartments are filled with a porous ion exchange materials through which the water to be deionized flows. The ion exchange materials are commonly mixtures of cation exchange resins and anion exchange resins. Alternating layers of these resins have been suggested. Ion exchange materials consisting of woven and non-woven fibers have also be disclosed. The compartments adjoining the diluting compartment into which the ions are moved by the applied electric field, called concentrating compartments, may be filled with ion exchanging materials or with inert liquid permeable materials. An assembly of one or more pairs of diluting or concentrating compartments, often referred to as a "cell pair", is bounded on either side by an anode and a cathode, thereby enabling the application of an electric field perpendicular to the general direction of liquid flow.

Although past electrodeionization devices are effective and provide good results, need continues for further improvement thereto, and in particular, for increasing the capacity and throughput of such devices, along predictable linearly-scaled increments, without compromising good "ultra-pure" deionization.

SUMMARY

In response to the above need, it is found that comparatively fast deionization can be accomplished in a scalable deionization device wherein the flow of waste and product streams through several ion concentration and depletion compartments occurs substantially contemporaneously (i.e., "parallel" flow paths), but that within each compartment, liquid flows sequentially through a series of channels (i.e., "serial" flow paths). Basically, amongst the compartments, the flow is parallel; but within the compartments, the flow is serial.

Although the invention should not be limited to any theory in explanation thereof, it is felt that device's parallel flow path improves flow rate (cf., by providing contemporaneous processing among several compartments), whereas the serial flow path maintains good product water quality (cf., by providing a tortuous flow path that is sufficiently long to assure good residence time). The parallel flow path, owing to the similar fluid dynamics operative in each compartment, provides appropriate foundation for the device's linearly-scalable configuration of components.

As adjuncts to the device's novel configuration, the present invention embraces certain additional related technologies. A principal one of these adjuncts is the employment of segmented electrodes for either the device's anode assembly and/or its cathode assembly. In one desirable embodiment, only the anode assembly is segmented, with the cathode assembly essentially comprising a single sinusoidal plate. Other embodiments are possible. In each, advantage is realized by connecting the anode and cathode assemblies—whether segmented or not—to a single multiple-output power supply.

Other features of the invention include its novel fluid distributors, the constituency of its ion exchange media, the use of segmented membrane media, and a contoured framing element having symmetrically-located ports. These and other features, singularly or collectively, provide the advantages of design scalability, good transmembrane pressure control, durability (particularly, in respect of leaks), robust operation, and reliable electrical performance.

In a principal embodiment, the electrodeionization device—through which flows a first and second flow path—comprises a plurality of depletion compartments and a plurality of concentration compartments interposed between an anode assembly and a cathode assembly. The depletion and concentration compartments are arranged in alternating sequence. In respect of parallel flow, the first and second flow paths are both configured to introduce fluid into and release fluid from their respective depletion and concentrations compartments substantially contemporaneously. In respect of serial flow, each compartment is provided with a plurality of channels—i.e., the actual functional sites wherein electrically-motivated cross-compartment ion exchange occurs—configured such that fluid brought thereinto flows into each channel substantially sequentially.

In light of the above, it is a principal object of the present invention to provide an electrodeionization device having a configuration that is linearly-scalable, and that is, in respect of linearly-scaled embodiments thereof, capable of performing ultra-pure deionization predictably and well.

It is another object of the present invention to provide an electrodeionization device wherein fluid flows "in parallel" among its depletion and concentration compartments, but serially within said compartments (i.e., through the channels provided in each compartment).

It is another object of the present invention to provide an electrodeionization device having a cathode assembly and an anode assembly flanking the device's ion depletion and concentration compartments, wherein either the cathode and/or anode assemblies comprise segmented electrodes.

It is another object of the present invention to provide an electrodeionization device that employs the aforementioned segmented electrodes, and wherein the electrodes are connected to a single multiple-output power supply.

It is another object of the present invention to provide an electrodeionization device comprising ion depletion and concentration compartments that each have serially-linked channels, the device being configured such that there is consistency in the transmembrane pressure effected across and the electrical current delivered to each channel within any particular one of said compartments.

It is another object of the present invention to provide an electrodeionization device comprising ion depletion and concentration compartments, wherein each said compartment has serially-linked channels, and wherein the channels within concentration compartment and the channels within depletion compartments differ in the size of resin beads that fill said channels.

It is another object of the present invention to provide an electrodeionization device comprising ion depletion and concentration compartments that each have serially-linked channels, wherein the leading and trailing end of each said channel is punctuated by an integral, substantially non-collapsible flow distributor.

It is another object of the present invention to provide any of the aforementioned electrodeionization devices, wherein each channels in any given compartment is interfacially separated from the channels in an adjacent compartment by an individual membrane—as opposed to a single membrane that "blanket-wise" separates all the channels that face each other between compartments.

Other features and advantages of this invention will become apparent from the following detailed description of representative embodiments of the invention, taken in conjunction with the accompanying drawings.

DETAILED DESCRIPTION

The present invention provides an electrodeionization device having parallel flow paths established for both its product and waste streams. Although initially parallel, when these streams flow respectively into and through the device's ion depletion and concentration compartments, the local flow path established therein becomes serial (preferably, sinusoidal or "serpentine"). The device's parallel flow paths promote good throughput. Its serial flow paths promote good deionization. The device is fast, efficient, robust, and its configuration is comparatively easy to scale upwards to reliably and predictably accommodate larger water processing volumes.

Figure 2:
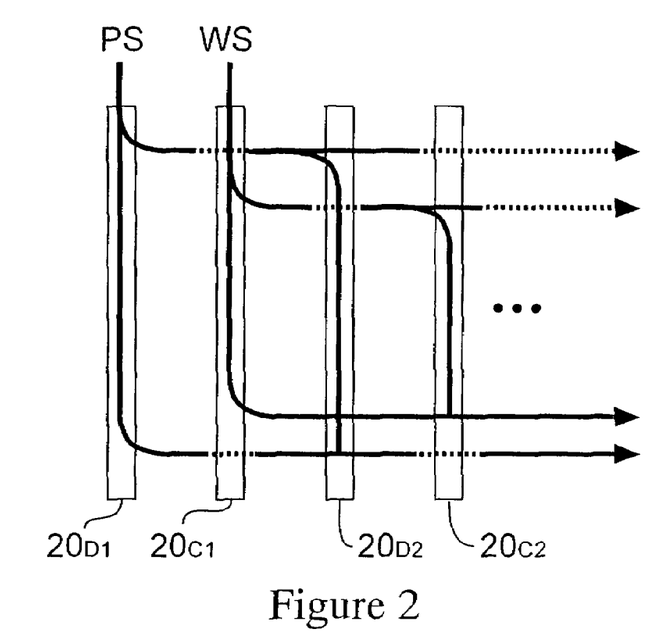
FIG. 2 illustrates diagrammatically an alternating sequence of ion depletion and concentration compartments $20_{D1}$, $20_{C1}$, $20_{D2}$, and $20_{C2}$, towards and through which flow "in parallel" a waste stream WS and a product stream PS.

FIG. 2 illustrates schematically the co-existing parallel flow paths of the device's waste and product stream, WS and PS. A shown therein, fluid is introduced into an alternating sequence of adjoining ion depletion compartments ($20_{D1}$ and $20_{D2}$) and ion concentration compartments ($20_{C1}$ and $20_{C2}$). As a result of the particular construction of the compartments, fluid entering into the ion depletion compartments $20_{D1}$, and $20_{D2}$—i.e., product stream PS—diverges immediately along two branches. One leads deeper into the guts of the compartment—i.e., into and through the channels wherein deionization occurs—before release at the opposite end thereof. The other branch leads immediately through and out of the compartment (without passing through its guts), the fluid being present therein only in transit en route to the next ion depletion compartment $20_{D2}$ downstream. The two paths continue downstream, flowing through or otherwise bypassing any intervening concentration compartment $20_{C1}$ and $20_{C2}$. A similar flow pattern is present also for the waste stream WS: i.e., fluid enters and flows through each ion concentration compartment $20_{C1}$ and $20_{C2}$ substantially contemporaneously, bypassing all intervening ion depletion compartments $20_{D1}$ and $20_{D2}$.

In the particular embodiment shown in FIG. 2, the flow through the compartments is "substantially contemporaneous," not "absolutely contemporaneous." The stack of ion depletion and concentration compartments are structured such that the fluid streams WS and PS will literally contact their respective compartments apparently one after the other. However, such contact occurs only in transit for at least the branch of the stream that does not enter deeper into the compartment. On the entry-side of the compartment, the fluid streams WS and PS branch off into each of their respective compartments substantially concurrently, allowing for the expected time it takes for the fluid to the flow across the compartments (or from one to another) without actually passing their deionization zones. In such cases, the input fluid into the ion depletion and concentrations compartments can be traced upstream continuously to a single common point source for both the product and waste streams, respectively, without passing meaningfully through any of the deionization zones of any preceding compartment. See, FIG. 2.

Although in the specific embodiments disclosed herein the "inter-compartment" flow is "substantially contemporaneous", those skilled in art can, if desired, design flow paths that are more literally contemporaneous, for example, by employing an appropriate system of fluid conduits outside the compartments. Such embodiments are intended to be within the scope of the present invention.

Figure 3A:
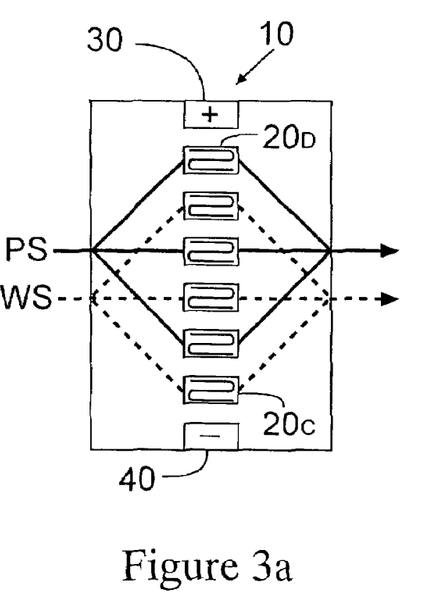
FIGS. 3a and 3b illustrate diagrammatically an electrodeionization device 10 according to the present invention and an example of a prior art EDI device 5.
Figure 3B:
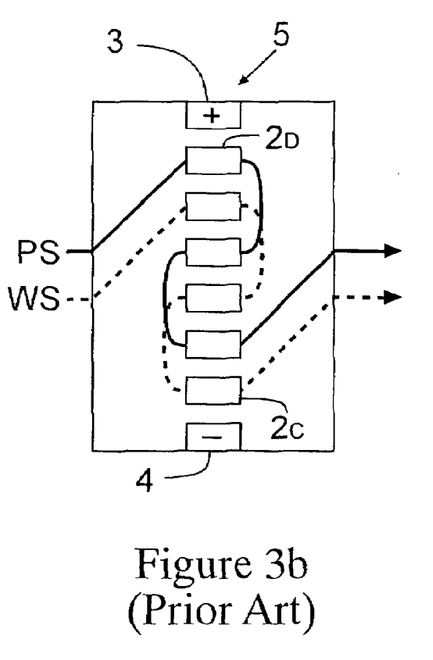

The diagrams of FIGS. 3A and 3B compare the parallel flow path of the present electrodeionization device 10 and a serial flow path of a prior art EDI device 5. As shown in FIG. 3A, the product stream PS and waste streams WS are brought into the inventive electrodeionization device 10 and led substantially contemporaneously into the deionization zones of their respective ion depletion compartments $20_D$ and ion concentration compartments $20_C$—the compartments being stacked in alternating sequence between anode assembly 40 and cathode assembly 30—and ultimately reconvened into single streams after passing through said zones. This stand in contrast to the serial flow path of the prior art EDI device 5 wherein, as shown in FIG. 3B, the product and waste streams PS and WS enter and pass through these stacked alternating compartments $2_D$ and $2_C$ sequentially.

When fluid enters into the deionization zones of a compartment 20, regardless of whether it's of the waste stream WS or the product stream PS, the flow thereof then becomes "serial". In particular, the fluid in conducted through a winding path in which it encounters and is passed through a series of channels which contain ion exchange media and through which a current is generated (during operation).

The channels in the electrodeionization device 10—like certain prior art EDI devices—are elongate in shape, having a width much narrower than its length. The elongate shape is preferred inasmuch as it promotes good fluid velocity of the fluid running therethrough, fluid velocity being one of several important determinants of good deionization. Within each compartment of the electrodeionization device 10, several of such channels (e.g., three) are provided, typically but not necessarily, side by side. When water is conducted through each of these channels one after the other (i.e., sequentially), the present invention realizes, among other things, good residence time within the media-containing zones of each compartment, thereby assuring (or otherwise providing) good exposure to the influence of the electrodeionizing current generated therethrough.

The term "serial" encompasses several possibilities, each constituting acceptable practice within the bound of the present invention. First and foremost is the design of a "serpentine" or "sinusoidal" flow path, such as illustrated schematically in FIG. 1 in respect of each of the compartments $20_{D1}$, $20_{C1}$, $20_{D2}$, and $20_{C2}$. Paying particular attention to ion depletion compartment $20_{D1}$, for example, one can envision how fluid will "snake" around the channels 22a, 22b, and 22c. The fluid enters through port 24 and is first conducted through the foremost end (cf., "top") of channel 22a, whereupon it permeates onward through the media therein (which is under constant exposure to an electric current) and exits at the rearmost end (cf., "bottom") of channel 22a. The fluid is then led into the closest end (cf. "bottom") of channel 22b, whereupon it permeates onwards through the media contained therein (also under constant exposure to an electric current) and exits at the furthest end of channel 22b (cf., "top"). Finally, the fluid enters into the last channel 22c from the foremost end (cf., "top") thereof, permeating onward through its media contents (also under constant exposure to an electric current), and exits towards the rearmost end (cf., "bottom") of channel 22c, where it is then led to it release out of the compartment $20_{D1}$ through port 26.

Figure 1:
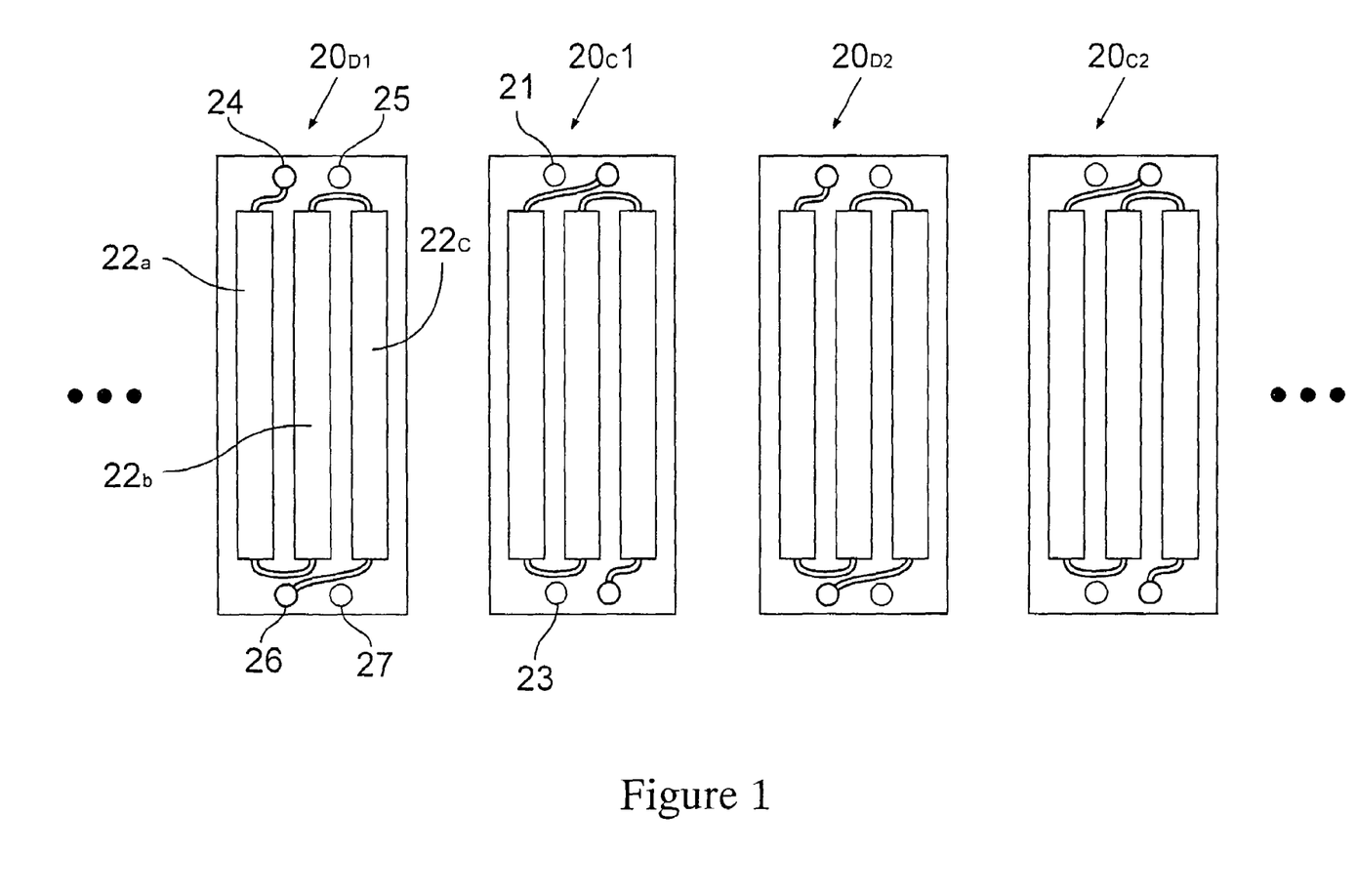
FIG. 1 illustrates diagrammatically an alternating sequence of ion depletion and concentration compartments $20_{D1}$, $20_{C1}$, $20_{D2}$, and $20_{C2}$ each compartment having serially-arranged channels $22_A$, $22_B$, and $22_C$, and configured and stackable to provide parallel flow paths to each compartment.

Focussing only on the points of entry and exit into and out of the channels only, the flow through the channels 22a, 22b, and 22c of ion depletion compartment $20_{D1}$ is essentially "top to bottom", "bottom to top", and "top to bottom." In an alternative serpentine arrangement, it is possible to have a pattern of entry/exit points wherein fluid enters all the channel from the "top" thereof and exit all the channel at the "bottom" thereof. This can be accomplished, for example, simply by providing conduits that lead from the "bottom" of a channel to the "top" of the next adjacent channel, if any. Whether or not such would be considered "serpentine" is not important: The flow remains "sequential".

Although serpentine flow paths are the desired sequential configuration, it is contemplated that other configurations are or would be possible. There is no requirement under the present invention that the local flow path (i.e., the "intra-compartment" flow path) through the compartments must be serpentine. All that is required is that each of a plurality of channels is encountered sequentially, i.e., in series. And, as those skilled in the art can appreciate, a plurality of channels can be arranged in a compartment in several patterns. Conduits—i.e., the part of the compartment that does not contain ion exchange media and that function solely to direct fluid to and away from the channels—leading to each of said channels need not always do so in serpentine fashion.

Also contemplated, for example, is the possibility of arranging four channels in a 2×2 array, wherein fluid is introduced (by conduits) into each channel sequentially in either a clockwise or counter-clockwise direction. Likewise, also possible is arrangement of three channels in a 1×3 array, wherein fluid is directed to the first channel, then the third, and then the middle channel. In these and other cases, the local flow path may not be fairly characterized as either "sinusoidal" and/or "serpentine", but they would still nonetheless be sequential.

In light of the above understanding of the parallel and serial flow paths, the present invention can be broadly defined as: an electrodeionization device through which is provided a first and second flow path, the electrodeionization device comprising a plurality of depletion compartments and a plurality of concentration compartments interposed between an anode assembly and a cathode assembly; the depletion and concentration compartments arranged in alternating sequence; said first flow path being configured to introduce fluid into and release fluid from each said depletion compartment substantially contemporaneously; said second flow path configured to introduce fluid into and release fluid from each said concentration compartment substantially contemporaneously; each depletion compartment having a plurality of ion depletion channels capable of allowing the release of ions from a fluid passing therethrough when a current is generated between said anode and cathode assemblies, each depletion compartment configured such that fluid brought thereinto flows into each said ion depletion channel substantially sequentially; and each concentration compartment having a plurality of ion concentration channels capable of allowing the migration of ions into a fluid passing therethrough when a current is generated between said anode and cathode assemblies, each depletion compartment configured such that fluid brought thereinto flows into each ion concentration channel substantially sequentially.

The product compartments are each bonded on the anode side by an anion permeable membrane and on the cathode side by an cation permeable membrane. The adjacent concentrating compartments are each correspondingly bonded by a cation permeable membrane on the anode side and an anion permeable membrane on the cathode side. The applied electric field causes anions to move from the product compartment across the anion permeable membrane into the concentrating compartment nearer the anode and cations to move from the product compartment across the cation permeable membrane into the concentration compartment nearer the cathode. The anions and cations become "trapped" in the concentrating compartments because the movement of anions toward the anode is blocked by a cation permeable membrane, and the movement of the cations toward the cathode is blocked by an anion permeable membrane. A flow of water is set up to remove the ions from the concentrating compartments. The net result of the process is the removal of ions from the water streams flowing through the product compartments and their concentration in the water flowing through the concentrating compartments.

In the present design, the flow rate in the product compartment is approximately 5.0 liters/hour and the concentrate is approximately 2.0 to approximately 2.5 liters/hour.

Contoured framing element 20 comprises, in its currently favored embodiment, a monolithic thermoplastic injection-molded element, having several non-ornamental multi-planar features that are integral to its structure and consequential to both the function and manufacture of the electrodeionization device 10.

Figure 5:
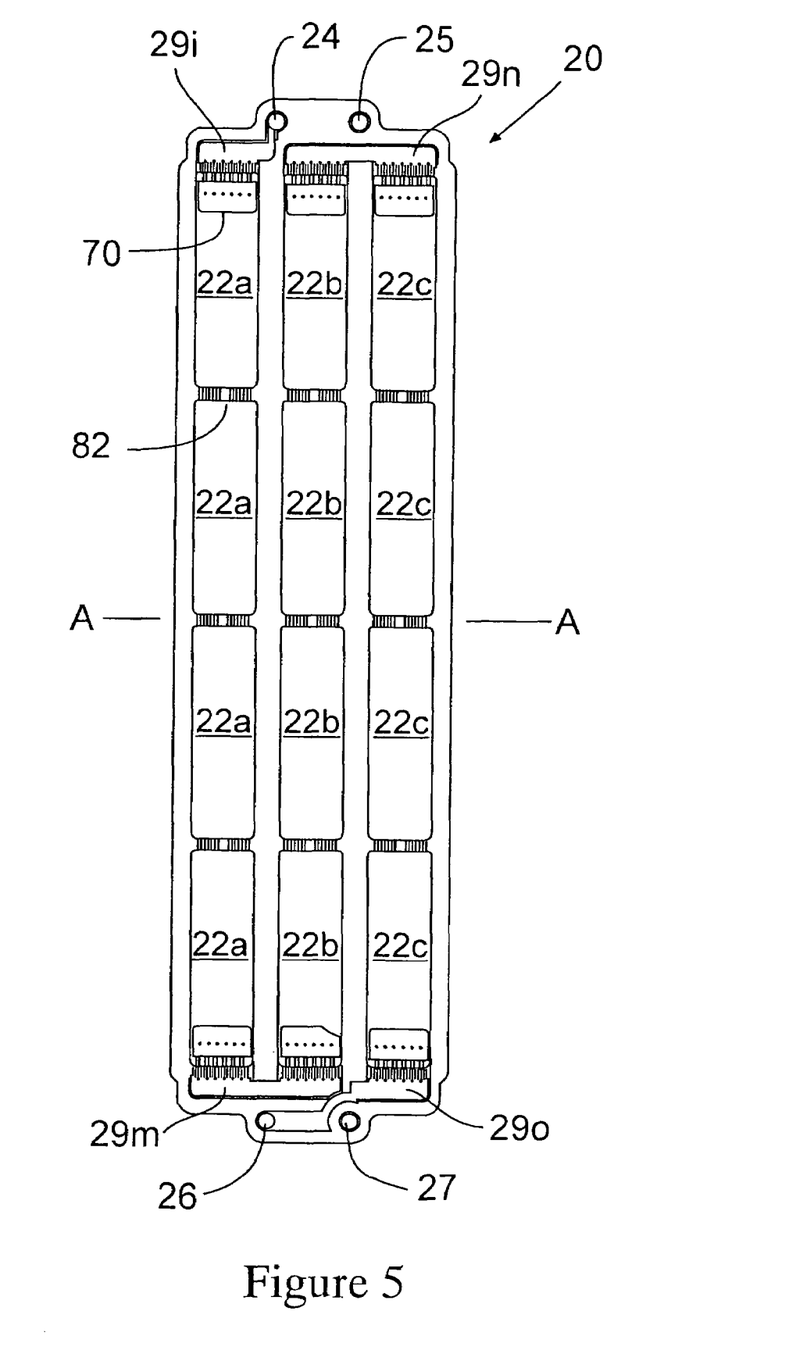
FIG. 5 illustrates one side of a contoured framing element 20 used in the construction of an electrodeionization device according to the present invention.
Figure 6:
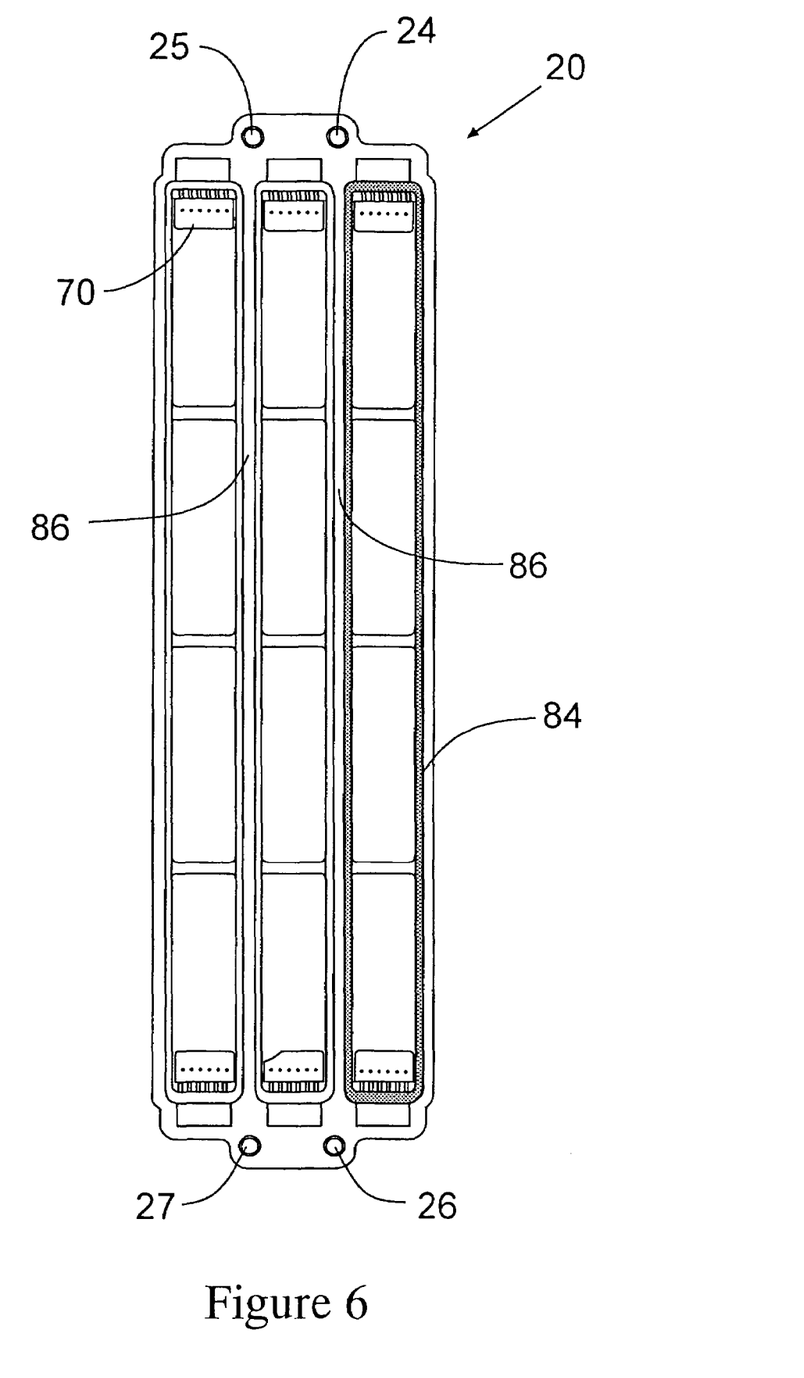
FIG. 6 illustrates the other side of the contoured framing element 20 illustrated in FIG. 5.

In respect particularly to the contoured framing element 20 illustrated in FIGS. 5 and 6, it is contemplated that one could consider each of the sub-channels that form channels 22a, 22b, and 22c—i.e., the open areas of those channels that in said Figures are structurally intersected by ribs 82—as "channels" in their own right. This is an acceptable interpretation, and still falls within the definition of the present invention. Referring in particular to FIG. 5, whether one considers the "channels" as being the twelve individual sub-channels, or alternatively, the three rib-segmented columns 22a, 22b, and 22c, the flow of liquid from one to the other throughout the entire series of channels remains "sequential".

The contoured framing element 20 is symmetrical in respect of the positioning of its ports (i.e., the inlet, outlet, and two bypasses), such that when rotated 180°, the framing element 20 can be used for either an ion depletion compartment or an ion concentration compartment. This reduces the costs associated therewith. Furthermore, resultant of both the element 20's "port symmetry" and the device 10's "all parallel" design, one can scale upwards an electrodeionization device for any given flow rate of purified water by adding an appropriate additional number of electrochemical cells. For example, if there is a need for a device that can produce 50 liters/hour of purified water, then one would use ten identical cells interposed between the anode and cathode assemblies, each cell having a flow rate of 5.0 liters/hour.

The schematic layout of ports (24, 25, 26 and 27), conduits, and channels (22) of a typical sequence of framing elements 20—which by and large correspond directly with the layout of the same in the corresponding sequence of compartments made therefrom—is provided in FIG. 1. It will be noted therein that each of the framing elements $20_{D1}$, $20_{C1}$, $20_{D2}$, and $20_{C2}$ are identical, differing only in that the framing elements corresponding to the concentration compartments (i.e., framing elements $20_{C1}$ and $20_{C2}$) are rotated 180° relative to the orientation of the framing elements that correspond to the depletion compartments (i.e., framing elements $20_{D1}$ and $20_{D2}$).

Although identical, the arrangement of the framing elements provides for the desired concurrent waste and product flow paths. In particular, during deionization, the product flow path enters ion depletion compartment $20_{D1}$ through inlet port 24. Some of the flow goes deeper into the compartment; the rest goes—in parallel fashion—into the next ion depletion compartment $20_{D2}$. That portion that goes into the compartment is lead by a conduit (i.e., connecting fluid pathway 29i); into leading channel 22a, then into channel 22b (via connecting fluid pathway 29m), and then into channel 22c (via connecting fluid pathway 29n). At the tail end of trailing channel 22c, the flow is led by a conduit (i.e., connecting fluid pathway 29o) out of the compartment through outlet port 26. That portion of the product flow path that goes down into the next ion depletion compartment $20_{D2}$ does so by bypassing the concentration compartment $20_{C1}$ through its bypass port 21, entering depletion compartment $20_{D2}$ though its inlet port, flowing through its sequence of channels and eventually being released therefrom. Likewise, the flow released from depletion compartment $20_{D1}$ through outlet port 26 merges with that released from the next depletion compartment $20_{D2}$, after bypassing completely the intermediate concentration compartment $20_{C1}$ through its bypass port 23. This continues in similar fashion downstream.

By tracing the path through the compartments as shown in FIG. 1, it will be apparent that a similar flow and bypass pattern is established in the concurrently running waste flow path conducted among the ion concentration compartments $20_{C1}$ and $20_{C2}$, the principal difference being that fluid flows through the concentration compartments $20_{C1}$ and $20_{C2}$, bypassing any intermediate ion depletion compartments $20_{D1}$ and $20_{D2}$ through their bypass ports 25 and 27.

The contoured framing element 20 provides the framework upon which an EDI stack is built.

The manufacturing process can be accomplished by progressively stacking and fusing compartments, in a step-wise fashion in a press, starting at one end and finishing at the other.

In one mode of practice, the press operation begins by obtaining a contoured framing element 20 and thermally bonding to the appropriate side (see FIG. 6) of each individual channel 22a, 22b, and 22c, an ion permeable membrane, they the type thereof (anion or cation) being dependent on whether the compartment will function as an ion depletion compartment or as an ion concentration compartment.

Figure 7:
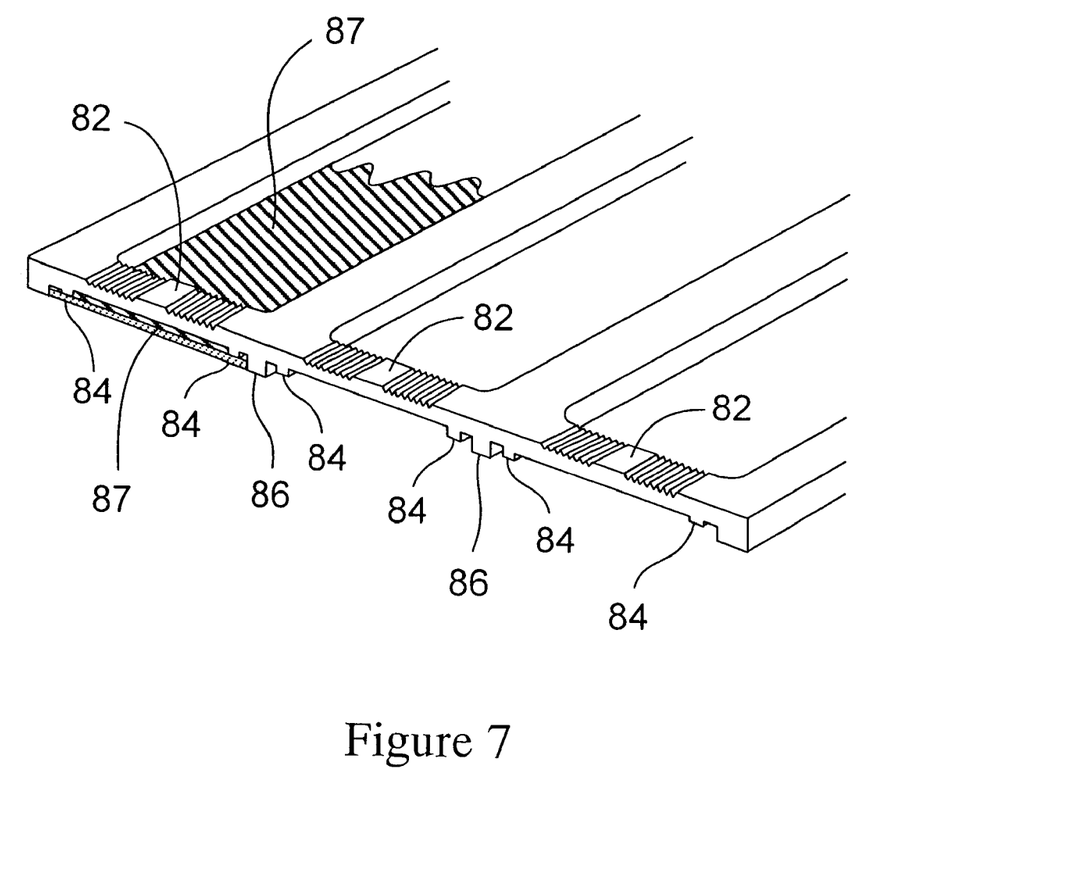
FIG. 7 illustrates a cross-section of the contoured framing element 20 illustrated in FIG. 5 along axis A-A.
Figure 8A:
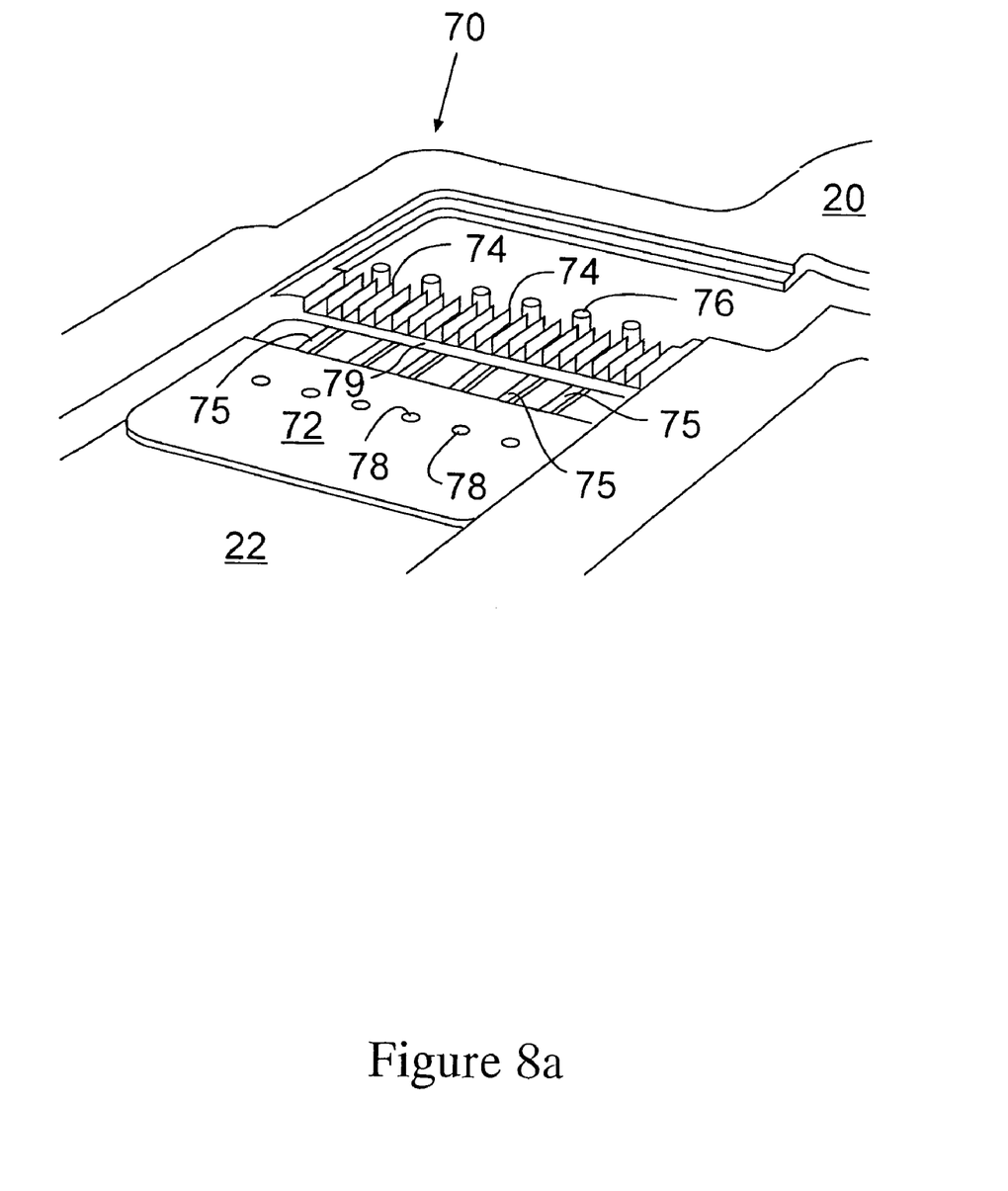
FIGS. 8a and 8b illustrates in greater detail a substantially non-collapsible integral flow distributor 60 used in the contoured framing element 20 illustrated in FIG. 5.
Figure 8B:
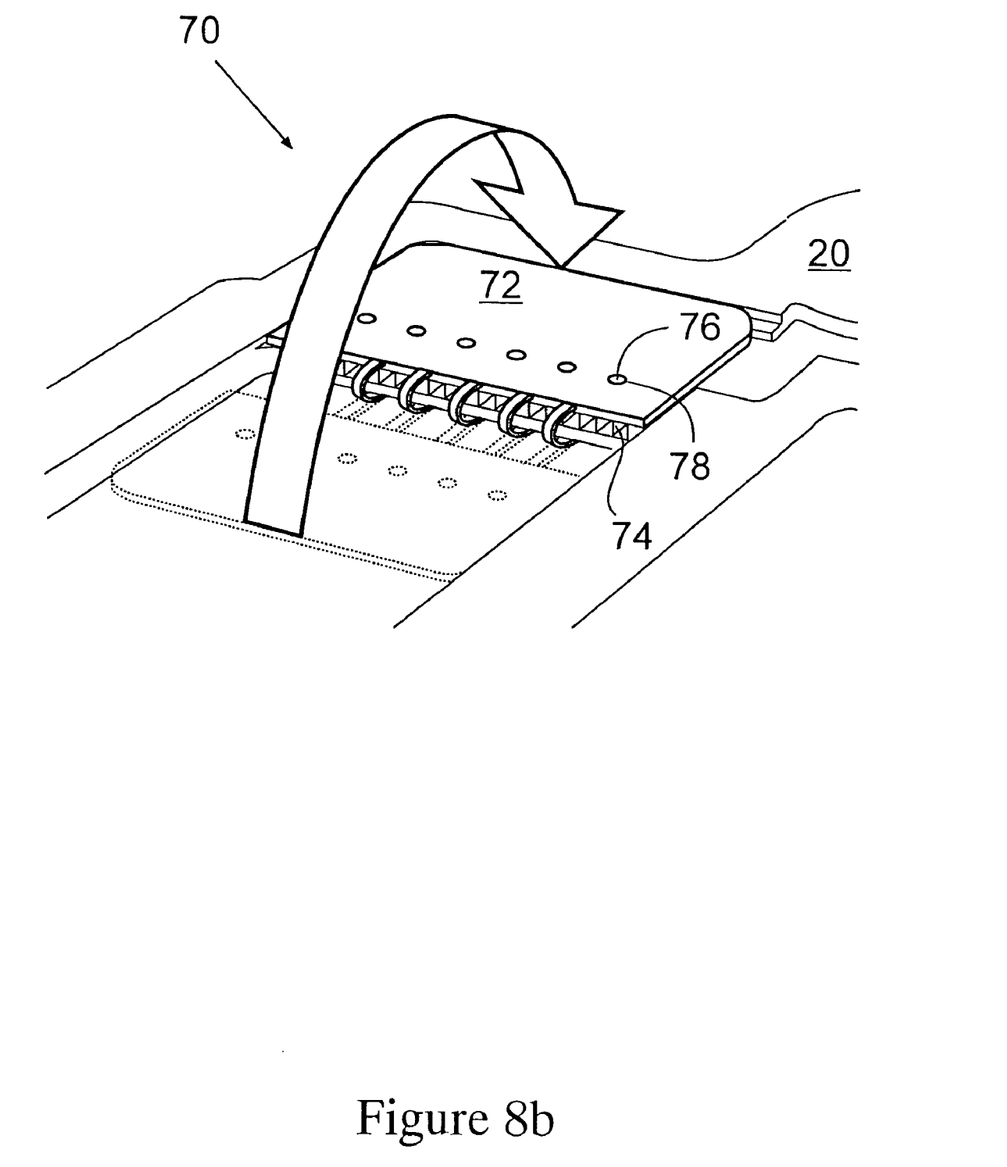

As shown in FIGS. 6 to 8, the contoured framing element 2 can be provided with mounting guides for the proper positioning of the membranes. In particular as shown in FIG. 7—and to some extent also in FIG. 6—guides 86 define the lateral position of the membranes on the framing element, whereas circumferential ridge 84 provides a defined attachment areas for a membrane 87.

Once the membranes are in position and mounted, each of the sub-channels are then filled with an appropriate ion exchange media, the constituency thereof again depending, at least in part, on whether the compartment will function for ion depletion or concentration.

The media-filled framing element is then placed in a press, whereupon another framing element—onto which already were mounted appropriate membranes—is stacked in appropriate registration thereonto, its orientation being rotated 180°. The press is operated. Under the influence of pressure and heat, the two are thermoplastically united, sealing the ion exchange media within the sub-channels between the straddling pair of membranes.

The sub-channels of the upper framing element is then filled with ion exchange media, then covered with the next membrane-bearing framing element in register and in proper orientation, and then bonded in the press. The process is repeated until a stack having the desired number of compartments is complete.

Aside from thermoplastic bonding (e.g., by hot press, by welding, by vibration press, etc.), other means for joining the framing elements would include the use of adhesives, gaskets, and the use of mechanical restraints, such as clamps, plates, bolts, bindings, and straps. These can be used alone or in combination by practitioners, in light of the present description, within the scope of the invention.

As shown in FIGS. 5 to 7, the channels 22a, 22b, and 22c are each divided into sub-channels by a series of cross-channel ribs 82. Ribs 82 serve a number of important roles. First, they provide the framing element 22—and thus, the complete EDI stack—with lateral rigidity, an important feature considering the weight and pressure of water expected to flow through the electrodeionization device 10. Another function is that the ribs 86 substantially prevent loose ion exchange media (e.g., resin beads) from settling to the bottom of the channels, which may occur, for example, in those embodiments wherein the stack is intended for operation in a standing upright position. If the resin beads settle, areas at the top of the channel may contain little or no exchange material, thus contributing little (if any) to deionization, and ultimately reducing the efficiency of the device. The ribs 86 assure that ion exchange media remains widely distributed over the entire length of the channel, assuring that all parts thereof contribute to deionization.

As best seen in FIG. 7, the ribs 82 are provided with a series of grooves to allow the passage of fluid from one sub-channel to the next. As those skilled in the art can appreciate, other means of accomplishing the same function are available, for example, by use of tunnels or slots (not shown) drilled through the ribs 82. Since grooves can be formed in a single common molding operation, they are preferred over those means that may require further assembly and/or a separate manufacturing step.

Desirably, the grooves of ribs 82 should lay essentially below the major surface of the back side of the contoured framing element, as opposed to extending upward off said surface. This allows a manufacturer to lay a long continuous membrane strip essentially flat thereon, without bulges, bumps, or like protuberances that can disturb or interfere with stack formation.

The construction of the inlet, outlet, and bypass ports is relatively straightforward. The bypass ports 25 and 27 are essentially holes that go completely through the contoured framing element 20. The inlet and outlet ports 24 and 26 are also holes that pass through the entire element, but they also have a lateral side wall that open into the conduits that lead to and from the channels 22a and 22c, respectively. In respect of their location on the contoured framing element, in preferred embodiments of the present invention, the outlet and inlet ports 24 and 26 should align with the bypass ports 25 and 27, when the contoured framing element is rotated 180°.

As illustrated in FIGS. 8a and 8b, contoured framing element 20 is provided with an integral fluid distributor 70. The integral fluid distributor 70 is an integral part of the contoured framing element 20, formed during manufacture, and—in its finished form—essentially operates as a sieve. Because of its structure, integral fluid distributor 70 has good resistance to collapse under the pressure and heat often employed in the manufacture of the stacked compartments of the present electrodeionization device. The integral fluid distributor 70 also serves to prevent or otherwise curtail migration of the resin materials—e.g., beads—out of the channels, hence their location at the tail and leading ends thereof.

As shown in FIG. 8a, the yet unassembled integral fluid distributor 70—after immediately being taken off a mold for example—comprises a plurality of fins 74; a flap 72 having a free end and hinged end, the hinged end being connected to the top internal edge 79 of channel 22 by a plurality of hinge strips 75; and flap securement means comprising a plurality of pegs 76 and a plurality of corresponding holes 78.

The fins 74 are long free standing upright walls that define a parallel arrangement of gutters or alleys, providing passage for fluid, while minimizing turbulence, pooling, and eddying that can occur as fluid flows into and out of a channel, whether caused by the configuration or disposition of the conduit leading into or out of the channel, or the change in fluid velocity resultant in the transition from an open conduit into a media filled channel, or otherwise. In addition, fins 74 collectively provide a support—like pillars—for the flap, preventing the flap—when folded thereonto—from collapsing downwards, blocking or otherwise limiting the passage of fluid into or out of the channels.

As shown in FIG. 8b, the assembly of fluid distributor 70 involves flipping or otherwise folding the flap 72 onto and over the fins 74, such that the pegs 76 fit securely within the holes 78, helping to lock or otherwise secure the flap. The flap and its securement means are preferably designed such that when assembled and secured, it provides a generally non-obstructive, flat surface that blends into and conforms to the profiles of the contoured framing element, such that when a membrane strip is positioned over the channel during manufacture, no undesirable bulges, bumps, or like protuberances are presented, that would otherwise disturb or interfere with stack formation.

The compartments are formed so that ion exchange resin material is housed within each of the sub-channels. Solid ion exchange materials are positioned within the sub-channels and are constrained from moving between the sub-channels by ribs 82, and between compartments by ion permeable membranes. Representative suitable solid ion exchange materials include beads, fibers, and the like. When employing ion exchange beads, typical bead diameter is about 0.04 inches or less, preferably between about 0.033 and about 0.012 inches in diameter (20 to 50 mesh).

In an electrodeionization device according to the present invention, it is desirable to assure that greater fluid pressures will be present in operation in the device's ion depletion channels (i.e., the product channels) than in its concentration channels (i.e., the waste channels) adjacent thereto. While prior EDI devices offer various means for creating such "positive pressure differential", in the configuration of the present invention, it is found that desirable operative pressure ratios can be affected by using beads of a certain average size in the concentration channels, on the one hand, and beads of a different average size in the depletion channels, on the other. By using substantially smaller beads in the concentration compartment, greater compaction occurs between beads. The more densely-packed beads in the concentration compartments provide a more restricted flow path, that—other variables being left substantially constant—will yield in operation less fluid pressure in said concentration compartments than in the adjacent depletion compartments. By creating such "positive pressure differential", the electrically-motivated flow of ions from the depletion compartments to the concentration compartments is less likely to be compromised or otherwise impeded by so-called "cross flow" (i.e., pressure-induced back flow).

Although compartment-differentiated bead size selection is particularly well-suited in respect of the inventions "all parallel" configuration, it is contemplated that advantages can also be realized in EDI devices designed for the serial flow of fluid to and from its product and waste compartments.

Any anion permeable membrane or cation permeable membrane having the strength to withstand the operating pressure differential, typically up to about 5 psi, can be utilized in the present invention.

Representative suitable anion permeable membranes include a homogenous type web supported styrene-divinylbenzene based with sulfonic acid or quarternary ammonium functional groups sold under identifications CR61-CZL-386 and AR 103-QZL-386 by Ionics Inc.; a heterogenous type web supported styrene-divinylbezene based resins in a polyvinylidene fluoride binder sold under the identifications MC-3470 (cation permeable) and MA-3475 (anion permeable) by Sybron/Ionac; homogenous unsupported membrane sheets based on polyethylene which is sulphonated or aminated with quarternary groups, sold under the tradename, Raipore by RAI Research Corporation; a homogenous type web supported styrene-divinylbenzene based with sulfonic acid or quarternary ammonium functional groups sold under the tradename Neosepta by Tokuyama Soda Co., Ltd.; a homogenous type web supported styrene-divinylbenzene based with sulfonic acid or quarternary ammonium functional groups sold under the name Aciplex by Asahi Chemical Industry Co., Ltd.

Figure 4A:
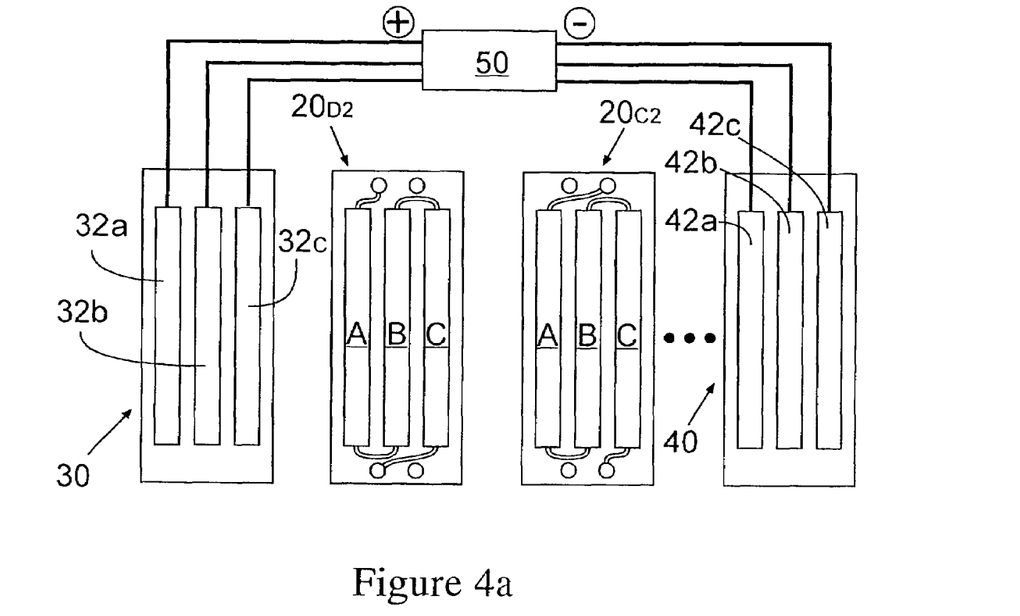
FIG. 4a illustrates diagrammatically segmented anode (32a, 32b, and 32c) and cathode (42a, 42b, and 42c) terminals that, in an embodiment of the inventive electrodeionization device, is connected to a single multiple-outlet power source 50.

As shown in FIG. 4a, another important feature incorporated into certain embodiments of the present invention is the use of segmented current generating means. In particular, multiple electrodes forming either a single anode assembly and/or a single cathode assembly are connected to multiple outlet power supply 50, to establish—when fluid is conducted through the device—separate current-generating circuits. Typically, the position of each of the multiple electrodes ($32a$-$c$ and $42a$-$c$) corresponds to each channel grouping (A-C) of each ion depletion and concentration compartment.

Although the use of segmented electrodes is particularly advantageous in respect of the inventive "all parallel" configuration, it is contemplated that advantages can also be realized in EDI devices designed for the serial flow of fluid to and from its product and waste compartments.

The number of segmented anodes and segmented cathodes is desirably related to the number of channel groups in the ion depletion or concentration compartments in a 1:1:1 ratio (anode:cathode:group). For example, as shown in FIG. 4a, each concentrating compartment ($20_{D2}$ and $20_{C2}$) is provides with three channels connected in the form of a sinusoidal flow path. Each channel grouping—a channel grouping comprising all the overlapping cross-compartment stack of channels—is provided with its own paired electrodes, e.g., cathode $32a$ and anode $42a$ for channel grouping A, cathode $32b$ and anode $42b$ for channel grouping B, and cathode $32c$ and anode $42c$ for channel grouping C. Current is provided through each channel grouping A, B, and C separately. As depicted in FIG. 4a, each electrode in the cathode and anode assemblies form a separate circuit with multiple outlet power supply 50.

As an alternative to a 1:1:1 ratio between anodes, cathodes, and channel groupings, it is possible that only one of either the anode assembly 40 or the cathode assembly 30 be segmented. The unsegmented electrode assembly in this regard can be a single unitary electroconductive plate configured, for example, to have a wide rectangular area, the extents thereof overlapping in blanket-wise fashion the area occupied by the channels grouping, or—as shown in FIG. 4b in both electrode assemblies 3 and 4—a more "form-fitting" sinusoidal shape.

As a further alternative, for certain embodiments, both the cathode and anode assemblies 30 and 40 are segmented, but not in a 1:1:1 ratio with the channel groupings A, B, and C. For example, one can design an electrodeionization device with 3 channel grouping, 3 segmented cathodes, and 2 segmented anodes. Also possible are: 3 channel groupings, 2 segmented cathodes, and 3 segmented anodes; or 3 channel groupings, 2 segmented cathodes, and 2 segmented anodes, or 2 channel groupings, 3 segmented cathodes, and 3 segmented anodes, etc. Essentially, segmentation can be present in either or both the electrode assemblies, wherein the number of "segments" is variable.

Though segmented, the individual electrodes collectively cover all the channel groupings of the electrodeionization device, thus enabling one to deliver the appropriate current output to certain areas of the module depending on the degree of deionization required or otherwise desired. Accordingly, a practitioner can easily customize operation of the device to different types of the feed-waters, depending on, for example, ionic content and dissolved carbon dioxide content.

Figure 4B:
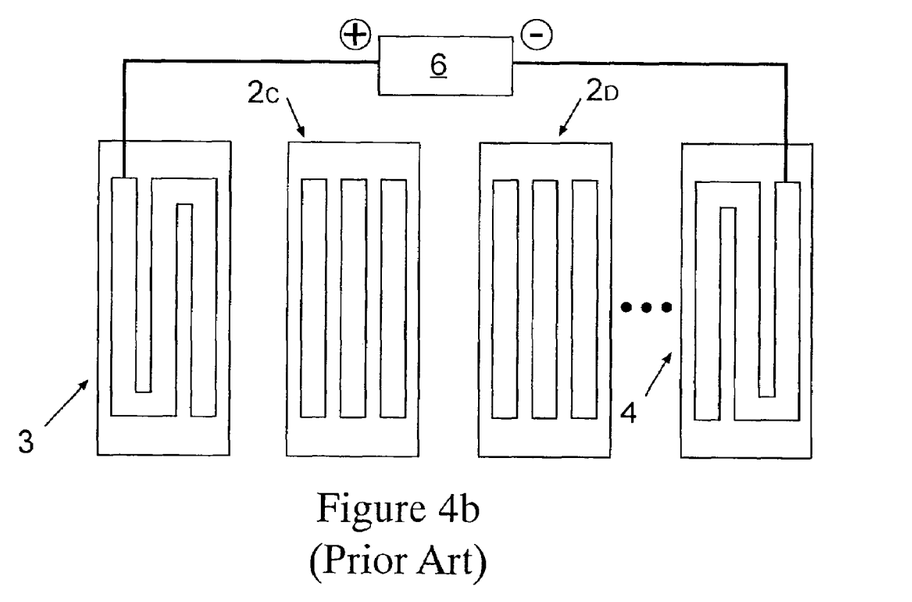
FIG. 4b illustrates diagrammatically a typical singular anode terminal 3 and typical singular cathode terminal 4 employed in a prior art EDI device 5.

By using unsegmented electrodes, such as in the prior art device shown in FIG. 4b, application of constant current through the electrodes 3 and 4 will result in a voltage that rises until it reaches power supply 6's maximum voltage. When this occurs, deionization will end because no further power can be delivered. By employing segmented electrodes, if one of the electrodes peaks to maximum power, then only one electrode in question is affected. The remaining electrodes can still operate and purified water still produced.

Several types of multiple outlet power supplies are currently available commercially from different manufacturers. Different power supplies will vary considerably in function, voltage, number of available outlets, and the like. Appropriate selection will be based on the particular needs of one's application. Though there are no broad limitations governing use of any specific multiple outlet power supply, in certain preferred embodiments, the power supply should be capable of furnishing DC current at a certain voltage to segmented electrical loads; and preferably, should be capable of redundant current sharing such that various segmented loads can be turned off while the remainder of the loads continue to operate.

The multiple-outlet power supply can be a constant current or a constant voltage power supply, although a constant current power supply is preferred, as the output water quality is in part related to the current across the module. Preferably, the output current of the power supply can be set before each use of the system, dependent upon the input water quality and the output range desired.

Other components of a "complete" electrodeionization device can include—as would be apparent to those skilled in the art—an external housing or cabinet; an electronic display to provide information relative to the operation of the device; a system of detectors and sensors for monitoring and regulating the flow of fluid through the device; a system of pumps, valves, and conduits leading to and away from the ion depletion and concentration compartments; additional circuitry and wiring, including system logic components; an electronic user interface for inputting instructions and/or data relevant to the conduct of the device; and other like components. The selection and configuration of such components is subject to variation and/or substitution, depending for example on the need and particular objectives of a given application. Details of and means for incorporating such other components can be found, for example, in the available technical literature and/or is within the skill in the art.

Furthermore, the present invention is not limited to a device comprising solely the components, subcomponents, and configurations described herein. The invention can be used either alone or in combination with any number of other liquid purification or separation systems or methods, such as those already known in the art. The invention can be used, for example, with UV-irradiation sources to destroy organic species either upstream or downstream of the inventive device.

While several embodiments are disclosed herein, those skilled in the art, having the benefit of the teaching set forth herein, can effect numerous modifications thereto. These modifications are intended to be within the scope of the present invention as set forth in the appended claims.

The invention claimed is:

1. An electrodeionization device having an ion concentration compartment, ion depletion compartment, and first and second fluid flow paths that flow parallel between the ion concentration and ion depletion compartments but flow serially within each compartment, the electrodeionization device comprising:
  i) an anode assembly having one or more of electrode plates;
  ii) a cathode assembly having one or more of electrode plates; and
  iii) a channel grouping, including one or more ion depletion compartments arranged in an alternating sequence with one or more ion concentration compartments, the channel grouping interposed between the anode and cathode assembly wherein each anode and cathode assembly is paired with only one channel grouping,
    a) each ion depletion compartment including,
      an anode side and a cathode side having an anion permeable membrane attached to the anode side and a cation permeable membrane attached to the cathode side, and a plurality of stacked serially arranged and sequentially linked fluid accessible ion depletion channels which contain an ion exchange material for releasing ions from a fluid passing therethrough when a current is generated between the anode and cathode assemblies,
      wherein each ion depletion compartment is configured such that a first portion of a fluid stream flowing into each compartment will sequentially flow into each ion depletion channel, and a second portion of the fluid stream will bypasses each ion depletion channel and travel through a first conduit bypassing any adjacent ion concentration compartments, and
    b) each ion concentration compartment including,
      an anode side and a cathode side having a cation permeable membrane attached to the anion side and an anion permeable membrane attached to the cation side and, a plurality of stacked serially arranged and sequentially linked fluid accessible ion concentration channels which contain an ion exchange material for migrating ions into a fluid passing therethrough when a current is generated between the anode and cathode assemblies,
      wherein each ion concentration compartment is configured such that a first portion of a fluid stream flowing into each compartment will sequentially flow into each ion concentration channel, and a second portion of the fluid stream will bypasses each ion concentration channel and travel through a second conduit bypassing any adjacent ion depletion compartments,
    wherein said first fluid flow path configured to introduce fluid into and release fluid from each said ion depletion compartment substantially contemporaneously,
    wherein said second fluid flow path configured to introduce fluid into and release fluid from each said ion concentration compartment substantially contemporaneously.

2. The electrodeionization device of claim 1, wherein said anode assembly and said cathode assembly each comprises three electrode plates.

3. The electrodeionization device of claim 1, wherein said anode assembly comprises two anode electrode plates; and said cathode assembly comprises two cathode electrode plates.

4. The electrodeionization device of claim 3, wherein the number of anode electrode plates, cathode electrode plates, and ion depletion channels in each ion depletion compartment, and the number of ion concentration channels in each ion concentration compartment is the same.

5. The electrodeionization device of claim 4, where said number is three.

6. The electrodeionization device of claim 3, wherein said anode assembly and said cathode assembly are connected to a single multiple-outlet power supply.

7. The electrodeionization device of claim 1, wherein each ion depletion compartment and each ion concentration compartment contains ion exchange resin beads, the average size of the resin beads in the ion concentration compartments being substantially smaller than the average size of resin beds in the ion depletion compartments.

8. An electrodeionization device for ultrapure electrodeionization of water, having concurrent and parallel flow paths for a product stream and a waste stream wherein the product and waste stream flow paths flow contemporaneously in parallel between product compartments and waste compartments, and flow serially within each individual compartment, the electrodeionization device comprising:
  i) a plurality of anode assemblies, each anode assembly includes a plurality of electrode plates;
  ii) a plurality of cathode assemblies, each cathode assembly includes a plurality of electrode plates; and
  iii) a plurality of channel groupings, including one or more ion depletion product stream compartments arranged in an alternating sequence with one or more ion concentration waste stream compartments, each channel grouping interposed between the anode and cathode assembly wherein each anode and cathode assembly is paired with only one channel grouping,
    a) each ion depletion product state compartment including an anion permeable membrane attached to the anode side and a cation permeable membrane attached to the cathode side, and a plurality of stacked serially arranged and sequentially linked fluid accessible ion depletion product stream channels which contain an ion exchange material for releasing ions from a fluid passing therethrough when a current is generated between the anode and cathode assemblies, and
    b) each ion concentration waste stream compartment including an anode side and a cathode side having a cation permeable membrane attached to the anion side and an anion permeable membrane attached to the cation side and said product stream flow path configured to introduce a product stream into each of the ion depletion product stream compartments by way of a product stream compartment inlet port wherein,
    c) a first portion of the product stream enters the product stream accessible channels having a plurality of serially linked ion depletion product channels, wherein ions are released from the product stream passing therethrough when a current is generated between the anode and cathode assemblies, and the product stream is released from each ion depletion product compartments by way of a product stream compartment outlet port, and flows towards the next ion depletion product compartment by way of a first conduit, bypassing the adjacent ion concentration waste compartment by flowing through a first product compartment bypass port, and
    d) another portion of the product stream bypasses the product stream accessible channels and flows towards the next ion depletion product compartment by way of a second conduit, bypassing the adjacent ion concentration waste compartment by flowing through a second product compartment bypass port, said a waste stream flow path configured to introduce a waste stream to each of the ion concentration waste stream compartments by way of a waste stream compartment inlet port wherein,
  e) a first portion of the waste stream enters the waste stream accessible channels having a plurality of serially linked ion concentration waste stream channels wherein ions migrate from the waste stream passing therethrough when a current is generated between said anode and cathode assemblies, and the waste stream is released from each ion concentration waste stream compartment by way of an outlet port, and flows towards the next ion concentration waste stream compartment by way of a first conduit, bypassing the adjacent ion depletion product compartment by flowing through a first waste compartment bypass port, and
  f) another portion of the waste stream bypasses the waste stream accessible channels and flows towards the next ion concentration waste stream compartment by way of a second conduit, bypassing the adjacent ion depletion product stream compartment by flowing through a second waste compartment bypass port.

9. The electrode ionization device of claim 8, wherein said anode assembly comprises three anode electrode plates; and said cathode assembly comprises three cathode electrode plates.

10. The electrodeionization device of claim 9, wherein
the number of anode electrode plates, cathode electrode plates, and ion depletion channels in each ion depletion compartment, and the number of ion concentration channels in each ion concentration compartment is the same.

11. The electrodeionization device of claim 10, wherein said number is three.

12. The electrodeionization device of claim 8, wherein said anode assembly and said cathode assembly are connected to a single multiple-outlet power supply.

13. An electrodeionization device through which is provided a product flow path and a waste flow path, wherein the product and waste flow paths flow contemporaneously in parallel between ion depletion product compartments and ion concentration waste compartments but flow serially within each compartment, the electrodeionization device comprising:
  i.) a plurality of anode assemblies, each anode assembly includes a plurality of electrode plates;
  ii.) a plurality of cathode assemblies, each cathode assembly includes a plurality of electrode plates; and
  iii.) a plurality of channel groupings, wherein each channel grouping is paired with and interposed between a separate anode and cathode assembly, each channel grouping includes,
    a) plurality of ion depletion product compartments having an anode side and a cathode side, each of the ion depletion product compartments have attached on the anode side an anion permeable membrane, and attached on the cathode side a cation permeable membrane, and include a plurality of stacked serially arranged and linked fluid accessible ion depletion product channels divided into subchannels packed with ion-exchange resin beads, and ions are released from a fluid passing therethrough when a current is generated between the anode and cathode assemblies, each ion depletion product compartment configured such that a portion of a fluid stream flows into each ion depletion product channel sequentially, and another portion of the fluid stream bypasses the fluid accessible channels and flows to the next ion depletion product compartment by way of a first conduit bypassing the adjacent ion concentration waste compartment by flowing through a first bypass port, and
    b) a plurality of ion concentration waste compartments having an anode side and a cathode side, each ion concentration waste compartment having attached on the anode side a cation permeable membrane, and attached on the cathode side an anion permeable membrane, wherein each ion concentration waste compartment alternates in sequence with each ion depletion product compartment, and each ion concentration waste compartment includes a plurality of stacked serially arranged and sequentially linked fluid accessible ion concentration waste channels divided into subchannels packed with ion-exchange resin beads,
    wherein the average size of the resin beads in the ion concentration waste compartments being substantially smaller than the average size of resin beds in the ion depletion product compartments, and ions migrate into a fluid passing therethrough when a current is generated between the anode and cathode assemblies, each ion concentration waste compartment configured such that a portion of a fluid stream flows into each of the ion concentration waste channel sequentially, and another portion of the fluid stream bypasses the water accessible waste channels and flows to the next ion concentration compartment by way of a second conduit, and bypassing the adjacent ion depletion compartment by flowing through a second ion bypass port,
    wherein said first fluid flow path configured to introduce fluid into and release fluid from each said ion depletion product compartment substantially contemporaneously;
    wherein said second fluid flow path configured to introduce fluid into and release fluid from each said ion concentration waste compartment substantially contemporaneously.

14. The electrodeionization device of claim 13, wherein the diameter of the resin beads is between about 0.033 and about 0.012 inch.

15. The electrodeionization device of claim 13, wherein said anode assembly and said cathode assembly each comprises three electrode plates.

16. An electrodeionization device through which is provided concurrent product and waste flow paths, wherein the product and waste flow paths flow contemporaneously in parallel between product and waste compartments but flow serially within each compartment, the electrodeionization device comprising:
  i) a plurality of anode assemblies, each anode assembly includes a plurality of electrode plates;
  ii) a plurality of cathode assemblies, each cathode assembly includes a plurality of electrode plates; and
  iii) a plurality of channel groupings, wherein each channel grouping is paired with and interposed between a separate anode and cathode assembly, each channel grouping includes,
    a) a plurality of ion depletion product compartments having an anode side and a cathode side, each ion depletion product compartment having attached on the anode side an anion permeable membrane, and attached on the cathode side a cation permeable membrane, and include a plurality of stacked serially arranged and sequentially linked fluid accessible ion depletion product channels divided into subchannels which contain therein ion exchange material wherein ions are released from a fluid passing therethrough when a current is generated between the anode and cathode assemblies, each ion depletion product compartment configured such that a portion of a fluid stream flows into each ion depletion product channel sequentially, and another portion of the fluid stream bypasses the fluid accessible ion depletion product channels and flows to the next ion depletion product compartment by way of a first conduit bypassing the adjacent ion concentration waste compartment by flowing through a first bypass port, and a plurality of ion concentration waste compartments having an anode side and a cathode side, each ion concentration waste compartment has attached on the anode side a cation permeable membrane, and on the cathode side an anion permeable membrane, each ion concentration compartment alternates in sequence with each ion depletion product compartment, and each ion concentration waste compartment includes a plurality of stacked serially arranged and sequentially linked fluid accessible ion concentration waste channels divided into subchannels which contain therein ion exchange material wherein the migration of ions into a fluid passing therethrough when a current is generated between said anode and cathode assemblies, each ion concentration waste compartment configured such that a portion of a fluid stream flows into each of the ion concentration waste channel sequentially, and another portion of the fluid stream bypasses the water accessible ion concentration waste channels and flows to the next ion concentration waste compartment by way of a second conduit, bypassing the adjacent ion depletion product compartment by flowing through a second ion bypass port, a) a portion of the water stream enters the water accessible channels having a plurality of serially linked ion depletion product channels, wherein ions are released from water passing therethrough when a current is generated between the anode and cathode assemblies, and water is released from each ion depletion product compartments by way of a product compartment outlet port, and flows towards the next ion depletion product compartment by way of a first conduit, bypassing the adjacent ion concentration waste compartment by flowing through a first product compartment bypass port, and b) a portion of the water stream bypasses the water accessible channels and flows towards the next ion depletion product compartment by way of a second conduit, bypassing the adjacent ion concentration compartment by flowing through a second product compartment bypass port, said a waste stream flow path configured to introduce a water stream to each of the said ion concentration waste compartments by way of a waste compartment inlet port wherein, c) a portion of the water stream enters the water accessible channels having a plurality of serially linked ion concentration waste channels, wherein ions migrate from water passing therethrough when a current is generated between said anode and cathode assemblies, and water is released from each ion concentration waste compartment by way of an outlet port, and flows towards the next ion concentration waste compartment by way of a first conduit and bypasses the adjacent ion depletion product compartment by flowing through a first waste compartment bypass port, and d) a portion of the water stream bypasses the water accessible channels and flows towards the next ion concentration waste compartment by way of a second conduit, bypassing the adjacent ion depletion product compartment by flowing through a second waste compartment bypass port.

17. The electrodeionization device of claim 16, wherein the thermoplastic framework of each said ion concentration compartment and each said ion depletion compartment is essentially identical.

18. The electrodeionization device of claim 16, wherein each ion depletion compartment and each ion concentration compartment contains ion-exchange resin beads, the average size of the resin beads in the ion concentration compartments being substantially smaller than the average size of resin beds in the ion depletion compartments.

19. The electrodeionization device of claim 18, wherein the diameter of the resin beads is between about 0.033 and about 0.012 inches.

20. The electrodeionization device of claim 16 wherein the number of anode plates, cathode plates, and ion depletion channels in each ion depletion compartment, and the number of ion concentration channels in each ion concentration compartment is the same.

* * * * *